United States Patent
Tomobe et al.

(10) Patent No.: US 10,614,505 B2
(45) Date of Patent: Apr. 7, 2020

(54) CLUSTERING SYSTEM, METHOD, AND PROGRAM, AND RECOMMENDATION SYSTEM

(71) Applicant: NEC Corporation, Tokyo (JP)

(72) Inventors: Katsufumi Tomobe, Yokohama (JP); Masafumi Oyamada, Tokyo (JP); Shinji Nakadai, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/745,874

(22) PCT Filed: Oct. 27, 2016

(86) PCT No.: PCT/JP2016/081873
§ 371 (c)(1),
(2) Date: Jan. 18, 2018

(87) PCT Pub. No.: WO2018/078761
PCT Pub. Date: May 3, 2018

(65) Prior Publication Data
US 2019/0340670 A1    Nov. 7, 2019

(51) Int. Cl.
*G06Q 30/00* (2012.01)
*G06F 17/30* (2006.01)
*G06Q 30/06* (2012.01)
*G06F 16/28* (2019.01)

(52) U.S. Cl.
CPC ....... *G06Q 30/0631* (2013.01); *G06F 16/285* (2019.01); *G06F 16/288* (2019.01)

(58) Field of Classification Search
CPC .................................................. G06Q 30/0631
See application file for complete search history.

(56) References Cited

U.S. PATENT DOCUMENTS

| | | | |
|---|---|---|---|
| 2009/0300547 A1 | 12/2009 | Bates et al. | |
| 2009/0307049 A1* | 12/2009 | Elliott, Jr. .......... | G06Q 30/0201 705/7.29 |
| 2016/0092781 A1 | 3/2016 | Byrnes et al. | |

OTHER PUBLICATIONS

Jonathan Chang et al., "Relational Topic Models for Document Networks," In AISTATS, 2009, pp. 81-88 (8 pages).*

(Continued)

*Primary Examiner* — Kathleen Palavecino
(74) *Attorney, Agent, or Firm* — Sughrue Mion, PLLC

(57) ABSTRACT

An object is to provide a clustering system capable of performing clustering of a plurality of types of items to be able to recommend an item whose corresponding textual data exists but relational data with another type of item does not exist, to the other type of item. A first clustering means 3001 performs clustering of first IDs, based on the relational data. A second clustering means 3002 performs clustering of second IDs, based on the relational data and textual data associated with the second IDs. A topic assignment means 3003 assigns a topic for each word included in textual data corresponding to each second ID. A parameter decision means 3004 decides a parameter used for first clustering processing, a parameter used for second clustering processing, and a parameter used for topic assignment processing. The processing described above is repeated until it is determined that a predetermined condition is satisfied.

6 Claims, 8 Drawing Sheets

| | APPLE | NOTEBOOK | PENCIL | WINE |
|---|---|---|---|---|
| USER 1 | 1 | 1 | 1 | 1 |
| USER 2 | 1 | 1 | 0 | 0 |
| USER 3 | 1 | 0 | 0 | 1 |

(56) References Cited

OTHER PUBLICATIONS

Badrul Sarwar et al., "Item-Based Collaborative Filtering Recommendation Algorithms," In ICWWW, 2001, pp. 285-295 (11 pages).
Chong Wang et al., "Collaborative Topic Modeling for Recommending Scientific Articles," Proceedings of the 17th ACM SIGKDD international conference on Knowledge discovery and data mining, Aug. 21, 2011, pp. 448-456.
Written Opinion of the International Searching Authority of PCT/JP2016/081873 dated Nov. 29, 2016.
International Search Report of PCT/JP2016/081873 dated Nov. 29, 2016.

* cited by examiner

|  | APPLE | NOTEBOOK | PENCIL | WINE |
|---|---|---|---|---|
| USER 1 | 1 | 1 | 1 | 1 |
| USER 2 | 1 | 1 | 0 | 0 |
| USER 3 | 1 | 0 | 0 | 1 |

| PRODUCT ID | EXPLANATION OR REVIEW | BAG OF WORDS |
|---|---|---|
| APPLE | RED AND SWEET AND SOUR ... | RED, SWEET AND SOUR, ... |
| PENCIL | VERY HARD TO WRITE ... | VERY, WRITE, ... |
| WINE | FRENCH PRODUCED CHARDONNAY ... | FRANCE, PRODUCED, CHARDONNAY ... |

CLUSTERING SYSTEM, METHOD, AND PROGRAM, AND RECOMMENDATION SYSTEM

CROSS REFERENCE TO RELATED APPLICATIONS

This application is a National Stage of International Application No. PCT/JP2016/081873 filed Oct. 27, 2016, the contents of which are incorporated herein by reference in its entirety.

TECHNICAL FIELD

The present invention relates to a clustering system, a clustering method, and a clustering program that perform clustering of a plurality of types of items, respectively, and a recommendation system, a recommendation method, and a recommendation program that utilize clustering.

BACKGROUND ART

A recommendation system is, for example, a system that performs clustering of customers from preference of the customers, and presents products highly likely to be purchased. Note that, although clustering is actually performed of customer IDs and product IDs, here, the clustering may be described as "perform clustering of customers", and "perform clustering of products", for convenience. The recommendation system can be applied to various trading activities performed inside and outside the Internet.

A model that performs clustering of customers and products from a purchase history and quantifies a possibility of purchasing is used in a general recommendation system. As a typical example of such a model, there are collaborative filtering and relational models. In the relational models, a Stochastic Block Model and a Mixed Membership Stochastic Block Model are often used. In the Stochastic Block Model and the Mixed Membership Stochastic Block Model, strength of relationship between a customer cluster and a product cluster (purchase tendency, for example) is quantified with a real number in a range from 0 to 1. For that reason, a product belonging to a product cluster strongly related to a customer cluster is recommended to a customer belonging to the customer cluster. Note that, it can be said that the purchase history is relational data indicating a relationship between products and customers.

A recommendation algorithm using collaborative filtering is described in NPL 1.

A relational topic model combining a relational model and a topic model is described in NPL 2. In the relational topic model, it is assumed that textual data is associated with all clustering targets.

CITATION LIST

Non Patent Literatures

NPL 1: Badrul Sarwar, George Karypis, Joseph Konstan, and John Riedl, "Item-based Collaborative Filtering Recommendation Algorithms", In ICWWW, pages 285-295, 2001

NPL 2: Jonathan Chang, and David M. Blei, "Relational Topic Models for Document Networks", In AISTATS, pages 81-88, 2009

SUMMARY OF INVENTION

Technical Problem

With a technique described in NPL 1, it is possible to recommend a product with a purchase history. However, for example, there is no purchase history for a newly released product (new product). With the technique described in NPL 1, it has not been possible to recommend such a product whose purchase history does not yet exist. This also applies to a general recommendation system.

Even for a product whose purchase history does not exist, textual data corresponding to the product exists. Examples of text information corresponding to the product include an explanation of the product, textual data indicating a raw material and the like, and a user review for the product. However, even for a product whose corresponding textual data exists, it is difficult to use the relational topic model described in NPL 2 to recommend the product to an appropriate customer. As described above, it is assumed that textual data is associated with all clustering targets, in the relational topic model. Then, even if the textual data corresponding to the product exists, textual data corresponding to the customer does not exist. For example, an explanation of the customer does not exist. Therefore, it is not possible to use the relational topic model to perform clustering of products and customers, respectively, and as a result, it is not possible to use the relational topic model to recommend the product to the appropriate customer.

Such a problem also occurs in a case other than a case of recommending a product to a customer. That is, such a problem also occurs in a case where an item whose corresponding textual data exists but relational data with another type of item does not exist is recommended to the other type of item.

The present invention aims to provide a clustering system, a clustering method, and a clustering program capable of performing clustering of a plurality of types of items to be able to recommend an item whose corresponding textual data exists but relational data with another type of item does not exist, to the other type of item.

In addition, the present invention also aims to provide a recommendation system, a recommendation method, and a recommendation program capable of specifying an appropriate customer as a customer to whom a product whose corresponding textual data exists but relational data with the customer does not exist is recommended.

Solution to Problem

A clustering system according to the present invention includes: a first clustering means that executes first clustering processing, based on relational data indicating a relationship between first IDs and second IDs, of performing clustering of the first IDs; a second clustering means that executes second clustering processing, based on the relational data and textual data associated with the second IDs, of performing clustering of the second IDs; a topic assignment means that executes topic assignment processing of assigning a topic for each word included in textual data corresponding to each second ID; a parameter decision means that executes parameter decision processing of deciding a parameter used for the first clustering processing, a parameter used for the second clustering processing, and a parameter used for the topic assignment processing; and a determination means that determines whether or not a predetermined condition is satisfied, in which the first clustering processing, the second clustering processing, the topic assignment processing, and the parameter decision processing are repeated until it is determined that the predetermined condition is satisfied.

In addition, a recommendation system according to the present invention includes: a clustering means that performs co-clustering, based on relational data indicating a relationship between customer IDs and product IDs and textual data associated with the product IDs, of the customer IDs and the product IDs, and decides a cluster relationship that is information indicating strength of a relationship between an individual cluster of the customer IDs and an individual cluster of the product IDs, to decide a topic distribution for each cluster of the product IDs; and a customer ID specifying means that specifies, in a case where a new product ID associated with textual data is given, a customer ID of a customer suitable for recommendation of a product indicated by the new product ID, based on the textual data, the topic distribution for each cluster of the product IDs, and the cluster relationship.

In addition, a clustering method according to the present invention includes: executing first clustering processing, based on relational data indicating a relationship between first IDs and second IDs, of performing clustering of the first IDs; executing second clustering processing, based on the relational data and textual data associated with the second IDs, of performing clustering of the second IDs; executing topic assignment processing of assigning a topic for each word included in textual data corresponding to each second ID; executing parameter decision processing of deciding a parameter used for the first clustering processing, a parameter used for the second clustering processing, and a parameter used for the topic assignment processing; and determining whether or not a predetermined condition is satisfied, in which the first clustering processing, the second clustering processing, the topic assignment processing, and the parameter decision processing are repeated until it is determined that the predetermined condition is satisfied.

In addition, a recommendation method according to the present invention includes: performing co-clustering, based on relational data indicating a relationship between customer IDs and product IDs and textual data associated with the product IDs, of the customer IDs and the product IDs, and deciding a cluster relationship that is information indicating strength of a relationship between an individual cluster of the customer IDs and an individual cluster of the product IDs, to decide a topic distribution for each cluster of the product IDs; and specifying, in a case where a new product ID associated with textual data is given, a customer ID of a customer suitable for recommendation of a product indicated by the new product ID, based on the textual data, the topic distribution for each cluster of the product IDs, and the cluster relationship.

In addition, a clustering program according to the present invention causes a computer to execute: first clustering processing, based on relational data indicating a relationship between first IDs and second IDs, of performing clustering of the first IDs; second clustering processing, based on the relational data and textual data associated with the second IDs, of performing clustering of the second IDs; topic assignment processing of assigning a topic for each word included in textual data corresponding to each second ID; parameter decision processing of deciding a parameter used for the first clustering processing, a parameter used for the second clustering processing, and a parameter used for the topic assignment processing; and determination processing of determining whether or not a predetermined condition is satisfied, in which the first clustering processing, the second clustering processing, the topic assignment processing, and the parameter decision processing are repeated until it is determined that the predetermined condition is satisfied.

In addition, a recommendation program according to the present invention causes a computer to execute: clustering processing that performs co-clustering, based on relational data indicating a relationship between customer IDs and product IDs and textual data associated with the product IDs, of the customer IDs and the product IDs, and decides a cluster relationship that is information indicating strength of a relationship between an individual cluster of the customer IDs and an individual cluster of the product IDs, to decide a topic distribution for each cluster of the product IDs; and customer ID specifying processing that specifies, in a case where a new product ID associated with textual data is given, a customer ID of a customer suitable for recommendation of a product indicated by the new product ID, based on the textual data, the topic distribution for each cluster of the product IDs, and the cluster relationship.

Advantageous Effects of Invention

According to the present invention, clustering is possible of a plurality of types of items to be able to recommend an item whose corresponding textual data exists but relational data with another type of item does not exist, to the other type of item.

In addition, according to the present invention, an appropriate customer can be specified as a customer to whom a product whose corresponding textual data exists but relational data with the customer does not exist is recommended.

DESCRIPTION OF EMBODIMENTS

Hereinafter, exemplary embodiments of the present invention will be described with reference to the drawings.

In addition, in the exemplary embodiments described below, a case will be described where clustering of first IDs and second IDs is performed, as an example. In the following, the first ID and the second ID will be described.

In addition, a type of clustering target is referred to as a domain. In the exemplary embodiments described below, the first ID and the second ID are domains, respectively. In the following description, a case where two domains exist is taken as an example.

Further, description will be made assuming that individual first IDs are respectively customer IDs and individual second IDs are respectively product IDs. Hereinafter, the first ID is referred to as the customer ID, and the second ID is referred to as the product ID. However, in the present invention, the first ID and the second ID are not limited to the customer ID and the product ID, respectively.

Textual data is associated with each product ID (second ID). Textual data exists in the product specified by the product ID. The textual data may be set as textual data corresponding to the product ID. The textual data may be a sentence or a set of words. For example, the textual data corresponding to the product ID includes an explanation of the product, textual data indicating a raw material and the like, and a user review for the product, but it is not limited thereto.

Figures 1, 2:
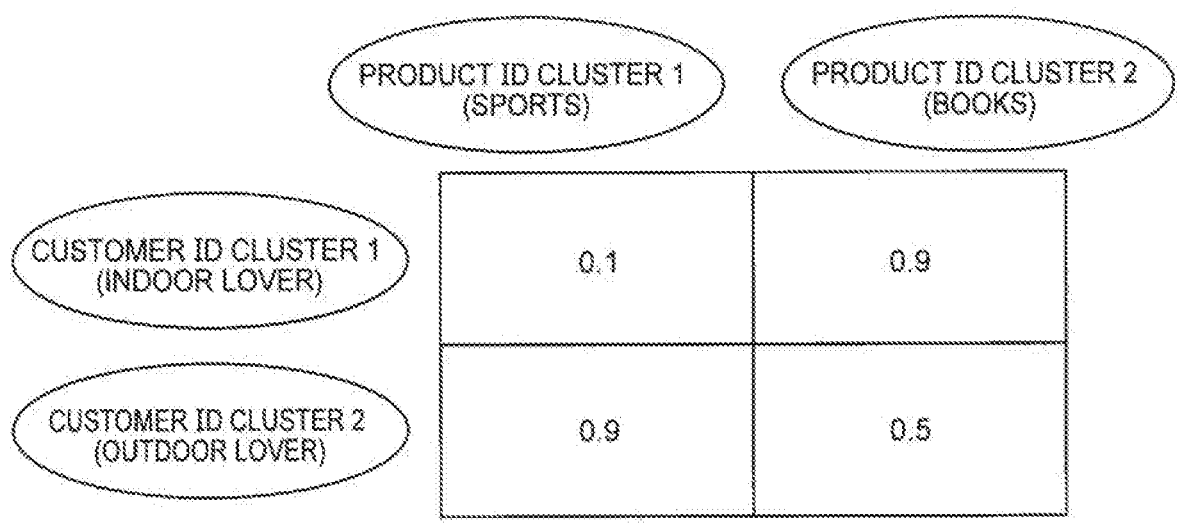
FIG. 1 It depicts an explanatory diagram illustrating an example of purchase history data.
FIG. 2 It depicts a schematic diagram illustrating an example of a cluster relationship.

In addition, in the exemplary embodiments described below, purchase history data is used as relational data indicating a relationship between the customer IDs and the product IDs. FIG. 1 is an explanatory diagram illustrating an example of the purchase history data. In the example illustrated in FIG. 1, "user 1", "user 2", and "user 3" are customer IDs. In addition, product names such as "apple", "notebook", "pencil", and "wine" are used as product IDs. The purchase history data indicates a relationship whether or not the customer specified by the customer ID has an experience of purchasing the product specified by the product ID. In FIG. 1, "1" indicates that the customer has the experience of purchasing the product, and "0" indicates that there is no experience. For example, the "user 2" has an experience of purchasing "apple", but has no experience of purchasing "wine".

The purchase history data (relational data) as described above can be represented by a bipartite graph in which each user ID and each product ID are nodes, and a link is provided from a user ID to a product ID with a purchase experience. Then, textual data is associated with each node (each product ID) of one domain.

Next, clustering and recommendation in "collaborative filtering", "relational model", and "relational topic model" will be described. Then, a new model developed by the inventor of the present invention (partial relational topic model (one-side relational topic model) described later) will be described. Note that, although clustering is actually performed of the customer IDs and the product IDs, the clustering may be described as "perform clustering of the customers", and "perform clustering of the products", for convenience. Similarly, a customer ID cluster (a cluster of the customer IDs) and a product ID cluster (a cluster of the product IDs) may be referred to as a customer cluster and a product cluster, respectively, for convenience.

[Collaborative Filtering]

The collaborative filtering is often used in a general recommendation system. In the collaborative filtering, a matrix is created based on a purchase history indicating a relationship between the customers and the products, and clustering of the customers and the products are respectively performed. Note that, the clustering is a task of dividing data (customer IDs and product IDs) into a plurality of clusters. It can be said that the customer cluster and the product cluster are aggregates that are aggregated with high similarity evaluated on the basis of a certain correlation coefficient. In the collaborative filtering, it is assumed that similar customers are more likely to purchase similar products, and similar products are recommended for customers belonging to the same cluster.

[Relational Model]

A recommendation system using the relational model is basically similar to a case using the collaborative filtering, but the relational model is a probability generation model. Here, a representative Stochastic Block Model (hereinafter, referred to as SBM) among relational models will be described. In addition, in the following description, the customers and the products are collectively referred to as nodes, and a purchase relationship is referred to as a link.

The SBM assigns a cluster to each node with a certain probability. The probability is assumed to follow a multinomial distribution. In addition, the link expressing the purchase relationship is generated with a Bernoulli distribution. Parameters of the Bernoulli distribution dominating a generation probability of the link exist for the number of customer clusters*the number of product clusters. In addition, information indicating strength of a relationship between an individual cluster of the customers (customer IDs) and an individual cluster of the products (product IDs) is referred to as a cluster relationship. For example, the cluster relationship is represented by a value in a range from 0 to 1 for each pair of the cluster of the customers (customer IDs) and the cluster of the products (product IDs). In addition, as the value of the cluster relationship is closer to 0, the relationship between the clusters is weaker, and as the value of the cluster relationship is closer to 1, the relationship between the clusters is stronger. In the following description, the cluster relationship may be represented by a symbol $\eta$. The cluster relationship $\eta$ is generated from a beta distribution. Parameters of the multinomial distribution dominating a cluster generation probability are generated from a Dirichlet distribution. Under these assumptions, the SBM estimates parameters that maximize a posterior probability calculated from a link currently observed. For example, when a belonging probability of a customer to a cluster is calculated in a customer domain, a value of a probability model between the cluster and each cluster of another domain (product domain) is referred to. When the purchase history is used, a belonging probability of a customer to a customer cluster is decided by how much the customer has purchased a product belonging to a product cluster strongly related to the customer cluster. Thus, customers who buy similar products gather in the same customer cluster and products purchased by similar customers gather in the same product cluster.

Here, an example of the cluster relationship is shown. As described above, the cluster relationship is information indicating the strength of the relationship between the individual cluster of the customer IDs (in other words, the first IDs) and the individual cluster of the product IDs (in other words, the second IDs). Hereinafter, a case will be described where the cluster relationship is a value in a range from 0 to 1, as an example. In addition, description will be made assuming that as the value of the cluster relationship is closer to 0, the relationship between the clusters is weaker, and as the value of the cluster relationship is closer to 1, the relationship between the clusters is stronger. The values of the cluster relationship are derived for the products of the number of customer ID clusters and the number of product ID clusters. FIG. 2 is a schematic diagram illustrating an example of the cluster relationship. Note that, "sports", "books", "indoor lovers" and "outdoor lovers" illustrated in FIG. 2 are labels given by a system administrator for convenience.

As the relationship is stronger between the customer ID belonging to the customer ID cluster and the product ID belonging to the product ID cluster, the value of the cluster relationship is larger in a combination of the two clusters. That is, as the relationship is stronger between the customer specified by the customer ID belonging to the customer ID cluster and the product specified by the product ID belonging to the product ID cluster, the cluster relationship approaches "1", and as the relationship is weaker, the cluster relationship approaches "0". In the example illustrated in FIG. 2, many customer IDs of customers who love indoor belong to a customer ID cluster 1. In addition, many customer IDs of customers who love outdoor belong to a customer ID cluster 2. In addition, many product IDs of sports products belong to a product ID cluster 1. For example, the cluster relationship between the customer ID cluster 2 and the product ID cluster 1 is 0.9, and is a value close to 1. This represents that the customer specified by the customer ID belonging to the customer ID cluster 2 often purchases the product specified by the product ID belonging to the product ID cluster 1, and represents that the relationship between the customer ID cluster 2 and the product ID cluster 1 is strong. In addition, for example, the cluster relationship between the customer ID cluster 1 and the product ID cluster 1 is 0.1, and is a value close to 0. This represents that the customer specified by the customer ID belonging to the customer ID cluster 1 is less likely to purchase the product specified by the product ID belonging to the product ID cluster 1, and represents that a relationship between the customer ID cluster 1 and the product ID cluster 1 is weak.

[Relational Topic Model]

Next, the relational topic model will be described. Here, a relational topic model described in NPL 2, which is a particularly typical example, will be described. The relational topic model described in NPL 2 is a model that incorporates a process of generating a sentence into the relational model described above. Clusters assigned by the relational model are also used as topics, and each topic has a word multinomial distribution. This point is similar to a mixed unigram model, a potential Dirichlet distribution method, and the like. It is assumed that all sentence data is handled as Bag of words and is probabilistically generated from the word multinomial distribution. As a result, clustering of the nodes is performed while the topics are added as well as the links. However, it is assumed that all the nodes have textual data in the relational topic model, not limited to the relational topic model described in NPL 2. For that reason, in a mode in which textual data is not associated with a node in one domain (customer ID domain) of the two domains (customer ID domain and product ID domain), it is difficult to apply the relational topic model.

[Partial Relational Topic Model (One-Side Relational Topic Model)]

The partial relational topic model is a new model developed by the inventor of the present invention. The partial relational topic model is a relational model in which some domains have a topic distribution inside. In a case where the number of domains is two and, one domain has a topic distribution inside, the partial relational topic model can also be referred to as the one-side relational topic model. The inventor of the present invention has developed a recommendation method using the partial relational topic model. In the following, an outline of an example of the recommendation method is shown. In the recommendation method, the following steps are executed.

1. (Initial Value Setting)

The number of customer ID clusters, the number of product ID clusters, a hyper parameter, a language dictionary, and the like are set.

2. (Gibbs Sampling)

On the basis of observation data, each hidden value, and the parameter are decided with Gibbs sampling.

3. (End Determination)

It is determined whether or not an end condition of the "2. (Gibbs sampling)" described above is satisfied. If the end condition is not satisfied, processing of the "2. (Gibbs sampling)" described above is repeated.

4. (Customer Determination)

On the basis of textual data of a new product, cluster assignment is executed for the new product, and an appropriate customer is determined as a customer to whom the new product is recommended.

First Exemplary Embodiment

Figure 3:
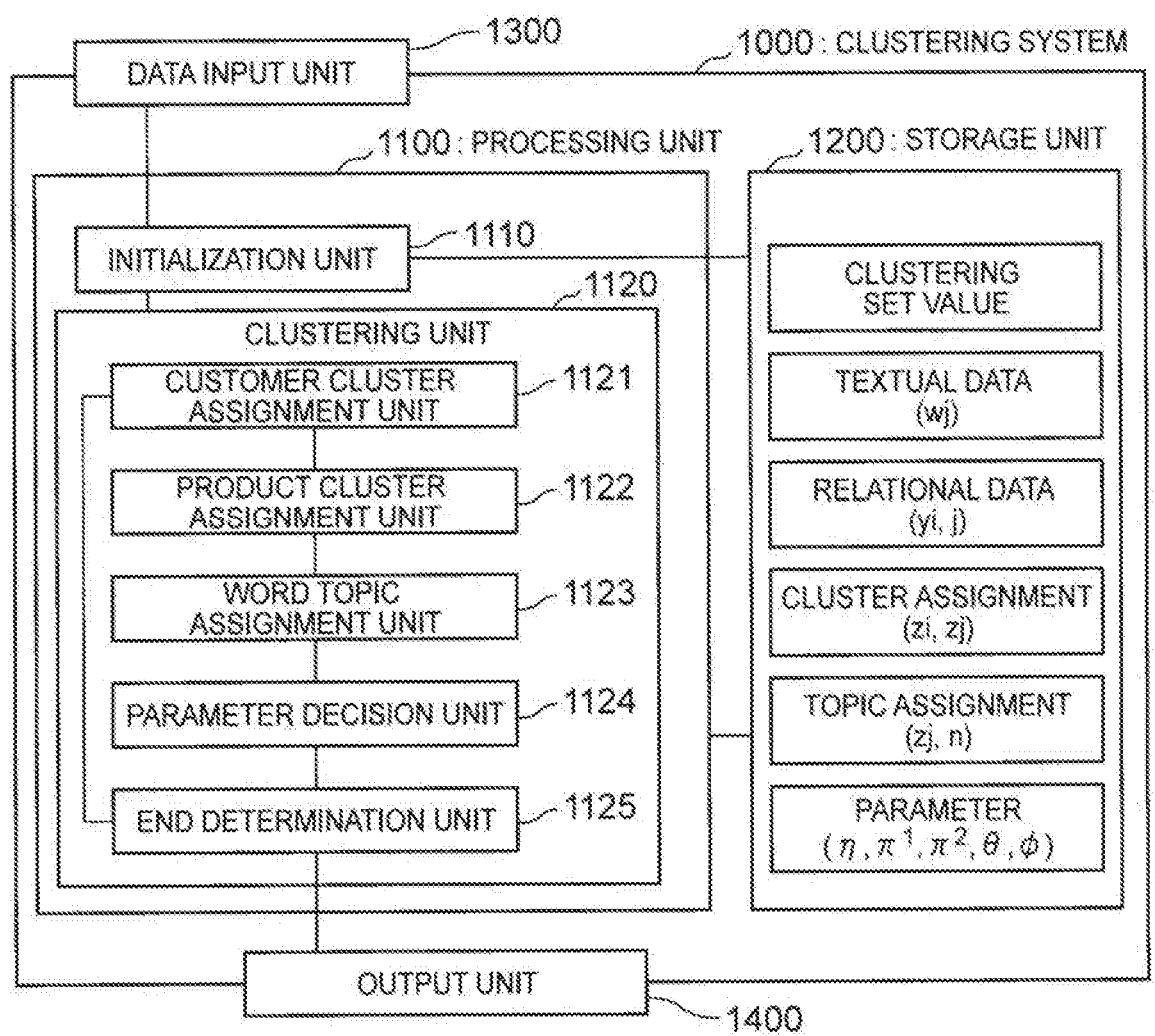
FIG. 3 It depicts a functional block diagram illustrating an example of a clustering system of a first exemplary embodiment of the present invention.

FIG. 3 is a functional block diagram illustrating an example of a clustering system of a first exemplary embodiment of the present invention.

A clustering system 1000 according to the first exemplary embodiment includes a data input unit 1300, a processing unit 1100, a storage unit 1200, and an output unit 1400. The processing unit 1100 includes an initialization unit 1110 and a clustering unit 1120. The clustering unit 1120 includes a customer cluster assignment unit 1121, a product cluster assignment unit 1122, a word topic assignment unit 1123, a parameter decision unit 1124, and an end determination unit 1125.

The data input unit 1300 acquires a data group used for clustering to which a one-side relational topic model is applied, and a set value of clustering. For example, the data input unit 1300 may access an external device to acquire the data group and the set value of clustering. Alternatively, the data input unit 1300 may be an input interface through which the data group and the set value of clustering are input.

The data group used for clustering includes purchase history data. The purchase history data is relational data indicating a relationship between customer IDs and product IDs, and can be represented as illustrated in FIG. 1, for example. As already described, the purchase history data indicates a relationship whether or not the customer specified by the customer ID has an experience of purchasing the product specified by the product ID. The purchase history data includes the customer IDs and the product IDs.

Figures 4, 5:
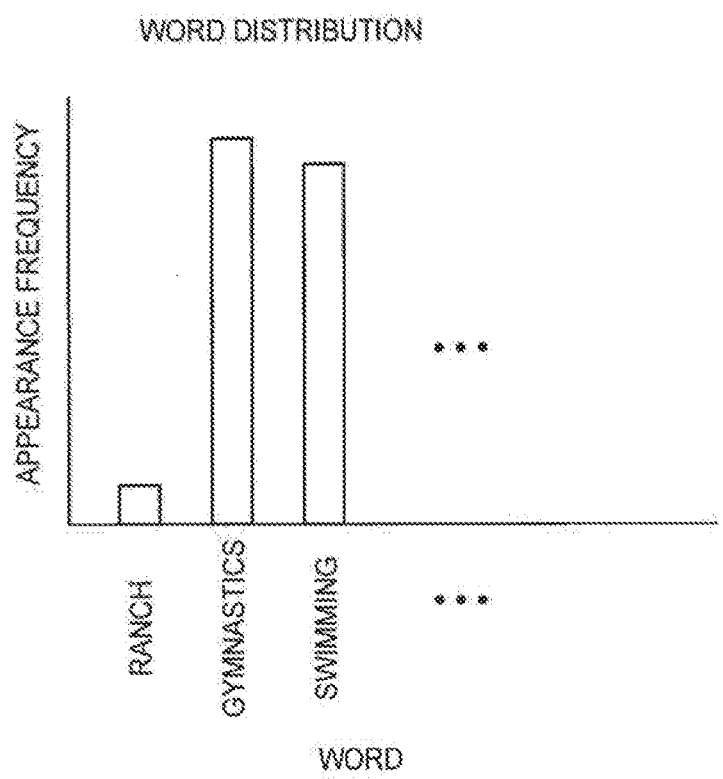
FIG. 4 It depicts an explanatory diagram illustrating an example of textual data corresponding to each product ID.
FIG. 5 It depicts a schematic diagram illustrating an example of a word distribution of one topic.

The data group used for clustering also includes textual data corresponding to each product ID. FIG. 4 is an explanatory diagram illustrating an example of the textual data corresponding to each product ID. In FIG. 4, a case where the product ID is a product name is taken as an example. In the example illustrated in FIG. 4, an explanation or a review is associated with the product. However, in the clustering system 1000, the textual data in a Bag of words format is handled. That is, the textual data is handled in a format that shows how many times each word appears in the explanation or the review. For example, the initialization unit 1110 divides a sentence and the like corresponding to each product ID into words by morphological analysis, and converts the words into the textual data in the Bag of words format.

Information input as the set value of clustering includes the number of customer ID clusters, the number of product ID clusters, and a word set of a dictionary for configuring the textual data in the Bag of words format from the sentence and the like.

The initialization unit 1110 receives the purchase history data (relational data), the textual data corresponding to each product ID, and the set value of clustering from the data input unit 1300, and stores the data and value in the storage unit 1200. In a case where the textual data corresponding to each product ID is not in the Bag of words format, such as the sentence, the initialization unit 1110 converts the textual data into the Bag of words format and then stores the textual data in the storage unit 1200. Hereinafter, the purchase history data (relational data) may be represented by a symbol yi,j (see FIG. 3). In addition, the textual data may be represented by a symbol wj (see FIG. 3).

In addition, the initialization unit 1110 initializes a parameter used for clustering and stores the parameter in the storage unit 1200.

The initialization unit 1110 sets initial values for a cluster assignment to each customer ID and a cluster assignment to each product ID. That is, at the time when clustering is not yet performed, an initial state of the cluster assignment to each customer ID and an initial state of the cluster assignment to each product ID are decided. The initialization unit 1110 may decide the initial state of the cluster assignment to each customer ID and the initial state of the cluster assignment to each product ID randomly, or in accordance with a uniform distribution. Hereinafter, the cluster assignment to each customer ID may be represented by a symbol zi, and the cluster assignment to each product ID may be represented by a symbol zj (see FIG. 3). The initialization unit 1110 stores the initial state of the cluster assignment to each customer ID and the initial state of the cluster assignment to each product ID in the storage unit 1200.

In addition, the initialization unit 1110 initializes a parameter representing ease of gathering (bias) of when nodes (customer IDs) gather in the customer ID cluster. Hereinafter, the parameter may be represented by a symbol $\pi^1$ (see FIG. 3). Similarly, the initialization unit 1110 initializes a parameter representing ease of gathering (bias) of when nodes (product IDs) gather in the product ID cluster. Hereinafter, the parameter may be represented by a symbol $\pi^2$ (see FIG. 3). The parameters $\pi^1$ and $\pi^2$ are probability distributions. The initialization unit 1110 stores the initialized $\pi^1$ and $\pi^2$ in the storage unit 1200.

In addition, the initialization unit 1110 initializes a word distribution for each topic. The topic is related to a word even if the topic is not specified directly as the word. For example, in textual information on a topic "Olympics", an appearance frequency of a word such as "gymnastics" or "swimming" is high, and an appearance frequency of a word unrelated to the Olympics is low. The word distribution for each topic is information indicating an appearance frequency of a word for each topic. However, the clustering system 1000 does not give a specific label such as "Olympics" to the topic, but gives an ID, such as "topic 1" or "topic 2", to each topic, for example. The specific label such as "Olympics" is decided by a system administrator, for example. FIG. 5 is a schematic diagram illustrating an example of the word distribution of one topic. The horizontal axis illustrated in FIG. 5 represents each word included in the dictionary, and the vertical axis represents the appearance frequency of the words in the topic. The initialization unit 1110 may decide the word distribution for each topic randomly, or in accordance with a uniform distribution. Hereinafter, the word distribution for each topic may be represented by a symbol φ (see FIG. 3). The initialization unit 1110 stores the initialized φ in the storage unit 1200.

Figure 6:
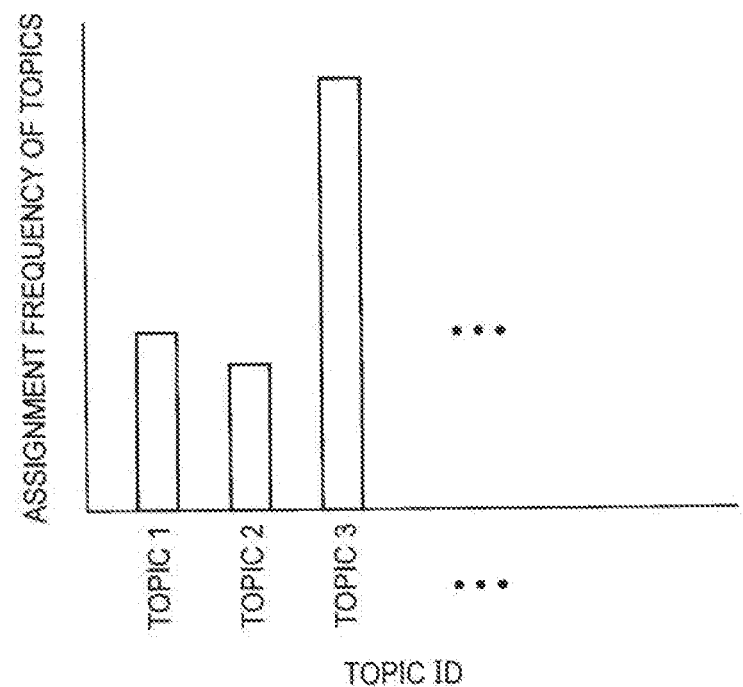
FIG. 6 It depicts a schematic diagram illustrating an example of information indicating an assignment frequency of a topic for one word.

In addition, the initialization unit 1110 initializes a topic assignment result for each word of each product ID. That is, an initial state of the topic assignment result is decided when topic assignment by the word topic assignment unit 1123 is not yet performed. As will be described later, the word topic assignment unit 1123 assigns a topic to each word of each product ID. Further, the word topic assignment unit 1123 generates information indicating an assignment frequency of each topic, for each word. FIG. 6 is a schematic diagram illustrating an example of the information indicating the assignment frequency of a topic for one word. The horizontal axis illustrated in FIG. 6 represents a topic ID of each topic, and the vertical axis represents the assignment frequency of each topic for a word of interest. The initialization unit 1110 decides an initial state of such a result obtained by processing of the word topic assignment unit 1123. The initialization unit 1110 may decide the initial state of the topic assignment result randomly, or in accordance with a uniform distribution. Hereinafter, the result obtained by the processing of the word topic assignment unit 1123 may be represented by a symbol zj,n (see FIG. 3). The initialization unit 1110 stores the initialized zj,n in the storage unit 1200.

Figure 7:
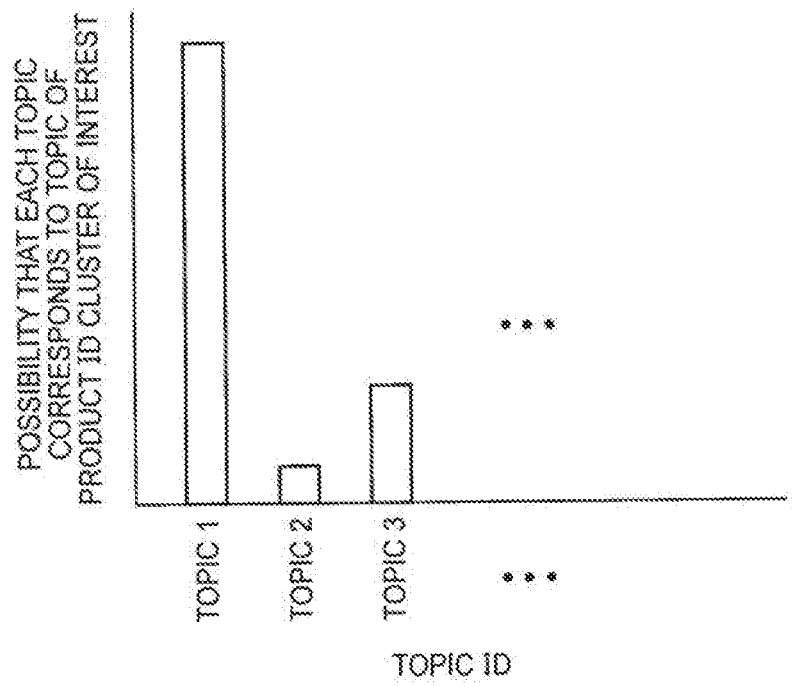
FIG. 7 It depicts a schematic diagram illustrating an example of a topic distribution of one product ID cluster.

In addition, the initialization unit 1110 initializes a topic distribution for each product ID cluster. The topic distribution for each product ID cluster is a parameter used when the word topic assignment unit 1123 executes topic assignment. The topic distribution is decided for each product ID cluster. Then, the topic distribution represents a degree of possibility that each topic corresponds to a topic of a product ID cluster of interest. FIG. 7 is a schematic diagram illustrating an example of the topic distribution of one product ID cluster. The horizontal axis illustrated in FIG. 7 represents the topic ID of each topic, and the vertical axis represents the possibility that each topic corresponds to the topic of the product ID cluster of interest. The initialization unit 1110 may decide the topic distribution for each product ID cluster randomly, or in accordance with a uniform distribution. Hereinafter, the topic distribution for each product ID cluster may be represented by a symbol θ (see FIG. 3). The initialization unit 1110 stores the initialized θ in the storage unit 1200.

The initialization unit 1110 initializes a cluster relationship η. The initialization unit 1110 decides an initial value of the cluster relationship for each combination of the customer ID clusters and the product ID clusters. As already described, the cluster relationship η is information (numerical value) indicating the strength of the relationship between the individual customer ID cluster and the individual product ID cluster. The initialization unit 1110 may decide the initial value of the cluster relationship randomly, or in accordance with a uniform distribution. The initialization unit 1110 stores the initialized η in the storage unit 1200.

The clustering unit 1120 repeats cluster assignment to the customer ID, cluster assignment to the product ID, topic assignment to each word of each product ID, and decision of each parameter, to perform co-clustering of the customer IDs and the product IDs.

The customer cluster assignment unit 1121 performs cluster assignment to each customer ID in accordance with the probability distribution ($\pi^1$). It can be said that the customer cluster assignment unit 1121 performs clustering of the customer IDs.

The customer cluster assignment unit 1121, during decision of a belonging probability that one customer ID belongs to one customer ID cluster, sets the belonging probability to a higher probability as the customer ID has more relationships with product IDs belonging to a product ID cluster strongly related to the one customer ID cluster. The customer cluster assignment unit 1121 only needs to specify the product ID cluster strongly related to the customer ID cluster on the basis of the cluster relationship. For example, the customer cluster assignment unit 1121 may decide a product ID cluster having a cluster relationship equal to or greater than a predetermined value with a customer ID cluster of interest, as a product ID cluster strongly related to the customer ID cluster of interest. In addition, the customer cluster assignment unit 1121 determines an amount of relationship between a customer ID of interest and product IDs belonging to the product ID cluster on the basis of the purchase history data. The customer cluster assignment unit 1121 only needs to set a belonging probability higher that the customer ID of interest belongs to the customer ID cluster of interest, as relationships increase that a customer specified by the customer ID of interest has purchased products specified by the product IDs belonging to the product ID cluster. That is, the customer cluster assignment unit 1121 only needs to set the belonging probability higher as links increase between the customer ID of interest and the product IDs belonging to the product ID cluster. As a result, the customer IDs of customers who purchase similar products gather in the same customer ID cluster.

The customer cluster assignment unit 1121 stores a result of clustering (cluster assignment) of the customer IDs in the storage unit 1200.

The product cluster assignment unit 1122 performs cluster assignment to each product ID in accordance with the probability distribution ($\pi^2$). It can be said that the product cluster assignment unit 1122 performs clustering of the customer IDs.

The product cluster assignment unit 1122, during decision of a belonging probability that one product ID belongs to one product ID cluster, refers to two pieces of information. The first information is the purchase history data. The second information is the topic distribution of a cluster of interest. In the following, more specific description will be made.

The product cluster assignment unit 1122, during decision of the belonging probability that one product ID belongs to one product ID cluster, sets the belonging probability to a higher probability as the product ID has more relationships with customer IDs belonging to a customer ID cluster strongly related to the one product ID cluster. The product cluster assignment unit 1122 only needs to specify the customer ID cluster strongly related to the product ID cluster on the basis of the cluster relationship. For example, the product cluster assignment unit 1122 may decide a customer ID cluster having a cluster relationship equal to or greater than a predetermined value with a product ID cluster of interest, as a customer ID cluster strongly related to the product ID cluster of interest. In addition, the product cluster assignment unit 1122 determines an amount of relationship between a product ID of interest and customer IDs belonging to the customer ID cluster on the basis of the purchase history data. The product cluster assignment unit 1122 only needs to set a belonging probability higher that the product ID of interest belongs to the product ID cluster of interest, as relationships increase that a product specified by the product ID of interest has been purchased by customers specified by the customer IDs belonging to the customer ID cluster. That is, the product cluster assignment unit 1122 only needs to set the belonging probability higher as links increase between the product ID of interest and the customer IDs belonging to the customer ID cluster. As a result, the product IDs of products to be purchased by similar customers gather in the same product ID cluster.

In addition, the product cluster assignment unit 1122, during decision of the belonging probability that one product ID belongs to one product ID cluster, refers to the topic distribution of the product ID cluster. As already described, the topic distribution of one product ID cluster can be schematically represented as illustrated in FIG. 7. The product cluster assignment unit 1122 increases the belonging probability that the product ID belongs to the product ID cluster as the topic distribution of the product ID cluster of interest and the topic distribution of the product ID of interest are closer to each other. For each word, information indicating the assignment frequency of each topic (hereinafter referred to as topic assignment frequency information) as schematically illustrated in FIG. 6 is stored in the storage unit 1200. It can be said that the topic assignment frequency information of each word included in textual data corresponding to a product ID is a topic distribution of the product ID. The product cluster assignment unit 1122 reads the topic assignment frequency information for each word included in the textual data corresponding to the product ID of interest, and compares the information with the topic distribution of the product ID cluster of interest. Then, for example, the product cluster assignment unit 1122 determines how many words are included in the textual data, the words corresponding to the topic assignment frequency information determined to be similar to the topic distribution of the product ID cluster. It can be said that, as the number of the words increases, the topic distribution of the product ID cluster of interest and the topic distribution of the product ID of interest are closer to each other. In this way, the product cluster assignment unit 1122 only needs to determine proximity between the topic distribution of the product ID cluster of interest and the topic distribution of the product ID of interest, and set the belonging probability higher as the proximity is closer.

The product cluster assignment unit 1122 stores a result of clustering (cluster assignment) of the product IDs in the storage unit 1200.

The word topic assignment unit 1123 assigns topics to each word of each product ID in accordance with the probability distribution (θ). The word topic assignment unit 1123 generates the topic assignment frequency information as schematically illustrated in FIG. 6 for each word, on the basis of the topics assigned to each word. Then, the word topic assignment unit 1123 stores the topic assignment frequency information for each word in the storage unit 1200.

Here, it is assumed that the textual data in the Bag of words format is generated with the word distribution of the topic on the basis of the topic distribution of each product ID cluster. The word topic assignment unit 1123 assigns topics to the word such that textual data having words having similar meanings are classified into the same topic, and further a probability increases that product IDs having the same topic distributions belong to the same product ID cluster.

The parameter decision unit 1124 decides the parameters $\pi^1$, $\pi^2$, φ, η, θ, and the like on the basis of processing results of the customer cluster assignment unit 1121, the product cluster assignment unit 1122, and the word topic assignment unit 1123, and stores the results in the storage unit 1200.

The parameter decision unit 1124 decides $\pi^1$ on the basis of a clustering result of the customer IDs, and decides $\pi^2$ on the basis of a clustering result of the product IDs. The parameters $\pi^1$ and $\pi^2$ follow a multinomial distribution. The parameter decision unit 1124 decides $\pi^1$ in accordance with a Dirichlet distribution, depending on the obtained customer ID cluster. Similarly, the parameter decision unit 1124 decides $\pi^2$ in accordance with the Dirichlet distribution, depending on the obtained product ID cluster.

Since the link connecting the customer ID and the product ID follows a Bernoulli distribution, the parameters are decided in accordance with a beta distribution, depending on presence or absence of the link, or the number of clusters of the nodes in each domain.

Since the word distribution $\varphi$ for each topic follows a multinomial distribution, the parameter decision unit 1124 changes $\varphi$ in accordance with an observed word and the cluster to which the product ID corresponding to the word is assigned.

In addition, the parameter decision unit 1124 decides the cluster relationship $\eta$ on the basis of an obtained result. In addition, the parameter decision unit 1124 decides the topic distribution $\theta$ for each cluster on the basis of the processing result of the word topic assignment unit 1123.

In addition, the link connecting the customer ID and the product ID corresponds to the relational data yi,j. The parameter decision unit 1124 decides the relational data yi,j probabilistically on the basis of the cluster relationship $\eta$.

The clustering unit 1120 repeats processing by the customer cluster assignment unit 1121, processing by the product cluster assignment unit 1122, processing by the word topic assignment unit 1123, and processing by the parameter decision unit 1124.

The end determination unit 1125 determines whether or not to end repetition of the above series of processing steps. The end determination unit 1125 determines to end the repetition of the above series of processing steps in a case where an end condition is satisfied, and determines to continue the repetition in a case where the end condition is not satisfied. In the following, an example of the end condition will be described.

For example, the number of repetitions of the above series of processing steps may be decided as one of the set values of clustering. The end determination unit 1125 may decide to end the repetition when the number of repetitions of the above series of processing steps reaches a predetermined number.

In addition, for example, the end determination unit 1125 may measure accuracy of clustering from the clustering result of the customer IDs and the clustering result of the product IDs stored in the storage unit 1200, and store the accuracy of clustering in the storage unit 1200. The end determination unit 1125 may calculate an amount of change from the accuracy of clustering measured last time to the accuracy of clustering measured most recently, and if the amount of change is small (specifically, an absolute value of the amount of change is equal to or less than a predetermined threshold value), determine to end the repetition. The end determination unit 1125 may measure a likelihood (log likelihood) of a model of clustering as the accuracy of clustering, for example.

Each element of the clustering unit 1120 may update various data and various parameters already stored in the storage unit 1200. For example, in a case where $\pi^1$ is newly decided, the parameter decision unit 1124 may update the already stored $\pi^1$ to a new $\pi^1$. Alternatively, each element of the clustering unit 1120 may add newly created data and parameters while leaving various data and various parameters already stored in the storage unit 1200. For example, for example, in a case where $\pi^1$ is newly decided, the parameter decision unit 1124 may additionally store the new $\pi^1$ in the storage unit 1200 while leaving the already stored $\pi^1$. However, in this case, in a case where $\pi^1$ is referred to, the clustering unit 1120 refers to the latest $\pi^1$. Here, $\pi^1$ has been described as an example, but the same applies to other parameters and data.

The storage unit 1200 is a storage device that stores various data acquired by the data input unit 1300 and various data obtained by processing of the processing unit 1100. The storage unit 1200 may be a main storage device of a calculator or a secondary storage device. In a case where the storage unit 1200 is the secondary storage device, the clustering unit 1120 can suspend the processing midway and restart thereafter. In addition, the storage unit 1200 may be divided into the main storage device and the secondary storage device, and the processing unit 1100 may store part of the data in the main storage unit and store other data in the secondary storage unit.

The output unit 1400 outputs results of processing by the clustering unit 1120 stored in the storage unit 1200. Specifically, the output unit 1400 outputs the cluster assignment (belonging probability of each customer ID to each customer ID cluster, and belonging probability of each product ID to each product ID cluster) stored in the storage unit 1200, the topics assigned to each word of each product ID, the topic assignment frequency information for each word, and all or some of various parameters.

The mode in which the output unit 1400 outputs the results is not particularly limited. For example, the output unit 1400 may output the results to another device. In addition, for example, the output unit 1400 may display the results on a display device.

The clustering unit 1120 including the customer cluster assignment unit 1121, the product cluster assignment unit 1122, the word topic assignment unit 1123, the parameter decision unit 1124, and the end determination unit 1125, the data input unit 1300, the initialization unit 1110, and the output unit 1400 are realized by, for example, a central processing unit (CPU) of a computer that operates in accordance with a program (clustering program). In this case, the CPU only needs to read the program from, for example, a program recording medium such as a program storage device (not illustrated in FIG. 3) of the computer, to operate as the data input unit 1300, the initialization unit 1110, the clustering unit 1120, and the output unit 1400, in accordance with the program.

In addition, each element in the clustering system 1000 illustrated in FIG. 3 may be realized by dedicated hardware.

In addition, the clustering system 1000 of the present invention may have a configuration in which two or more physically separated devices are connected together by wire or wirelessly. This also applies to an exemplary embodiment described later.

Figure 8:
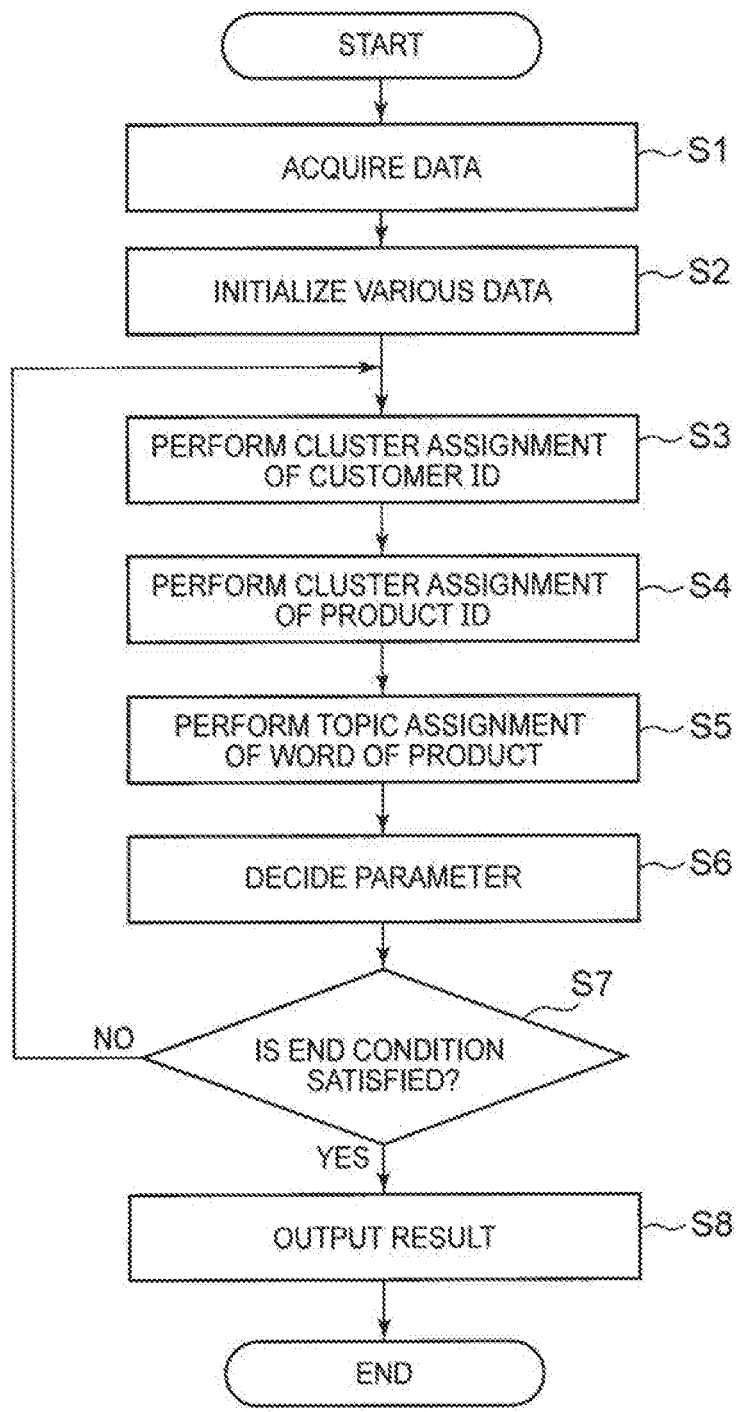
FIG. 8 It depicts a flowchart illustrating an example of processing progress of the first exemplary embodiment.

Next, processing progress of the first exemplary embodiment will be described. FIG. 8 is a flowchart illustrating an example of the processing progress of the first exemplary embodiment.

The data input unit 1300 acquires the data group used for clustering (purchase history data including the customer IDs and the product IDs, textual data corresponding to each product ID) and the set values of clustering (for example, the number of customer ID clusters, the number of product ID clusters, and the word set of the dictionary) (step S1).

The initialization unit 1110 stores the purchase history data acquired by the data input unit 1300, the textual data corresponding to each product ID, and the set values of clustering in the storage unit 1200 (step S2). At this time, in a case where the textual data corresponding to each product ID is not in the Bag of words format, the initialization unit 1110 converts the textual data into the Bag of words format and then stores the textual data in the storage unit 1200.

Further, in step S2, the initialization unit 1110 initializes various data and parameters. The initialization unit 1110 sets initial values for a cluster assignment to each customer ID and a cluster assignment to each product ID. In addition, the initialization unit 1110 initializes the topic assignment result (topic assignment frequency information for each word). In addition, the initialization unit 1110 initializes the parameters $\pi^1$, $\pi^2$, $\varphi$, $\theta$, and $\eta$. The initialization unit 1110 stores the initialized data and the parameters in the storage unit 1200.

After step S2, the clustering unit 1120 repeats the processing of steps S3 to S7 until the end condition is satisfied. In the following, the processing of steps S3 to S7 will be described.

The customer cluster assignment unit 1121 performs cluster assignment to each customer ID in accordance with the probability distribution ($\pi^1$) (step S3).

The customer cluster assignment unit 1121, during decision of a belonging probability that one customer ID belongs to one customer ID cluster, sets the belonging probability to a higher probability as the customer ID has more relationships with product IDs belonging to a product ID cluster strongly related to the one customer ID cluster.

The customer cluster assignment unit 1121 stores the result of the cluster assignment to each customer ID in the storage unit 1200.

Next, the product cluster assignment unit 1122 performs cluster assignment to each product ID in accordance with the probability distribution ($\pi^2$) (step S4).

The product cluster assignment unit 1122, during decision of the belonging probability that one product ID belongs to one product ID cluster, sets the belonging probability to a higher probability as the product ID has more relationships with customer IDs belonging to a customer ID cluster strongly related to the one product ID cluster. The product cluster assignment unit 1122, during decision of the belonging probability that one product ID belongs to one product ID cluster, increases the belonging probability that the product ID belongs to the product ID cluster as the topic distribution of the product ID cluster and the topic distribution of the product ID are closer to each other.

The product cluster assignment unit 1122 stores the result of the cluster assignment to each product ID in the storage unit 1200.

Next, the word topic assignment unit 1123 assigns topics to each word of each product ID in accordance with the probability distribution ($\theta$). The word topic assignment unit 1123 generates the topic assignment frequency information for each word on the basis of the topics assigned to each word. Then, the word topic assignment unit 1123 stores the topics assigned to each word of each product ID and the topic assignment frequency information for each word in the storage unit 1200 (step S5).

Next, the parameter decision unit 1124 decides the parameters on the basis of the results obtained in steps S3 to S5, and stores the parameters in the storage unit 1200 (step S6).

Next, the end determination unit 1125 determines whether or not the end condition is satisfied (step S7). In a case where the end condition is not satisfied (No in step S7), the end determination unit 1125 determines to repeat steps S3 to S7. Then, the clustering unit 1120 executes steps S3 to S7 again.

In a case where the end condition is satisfied (Yes in step S7), the end determination unit 1125 determines to end the repetition of steps S3 to S7. In this case, the output unit 1400 outputs the most recently obtained cluster assignment to each customer ID, cluster assignment to each product ID, topics assigned to each word of each product ID, topic assignment frequency information for each word, and all or some of the parameters (step S8).

Note that, as already described, the parameter decision unit 1124 may add newly created data and parameters while leaving various data and various parameters already stored in the storage unit 1200. In this case, the output unit 1400 may calculate averages of the respective parameters obtained in step S6 during a predetermined number of times of previous repetition, with reference to the time when the end condition is satisfied, and output the averages as the parameters.

According to the first exemplary embodiment, the clustering unit 1120 repeats cluster assignment of the customer ID, cluster assignment of the product ID, topic assignment to each word of each product ID, and parameter decision until the end condition is satisfied. As a result, not only the cluster assignment of the customer ID and the cluster assignment of the product ID but also the cluster relationship and the topic distribution for each cluster can be obtained. Through these data, even in a case where a product ID is given that is associated with textual data but has no relational data with a customer ID, it is possible to appropriately specify a customer to whom a product specified by the product ID is recommended. Therefore, according to the present exemplary embodiment, clustering can be performed of a plurality of types of IDs (customer IDs and product IDs) to be able to recommend a product ID that is associated with textual data but has no relational data with a customer ID, to an appropriate customer.

Second Exemplary Embodiment

Figure 9:
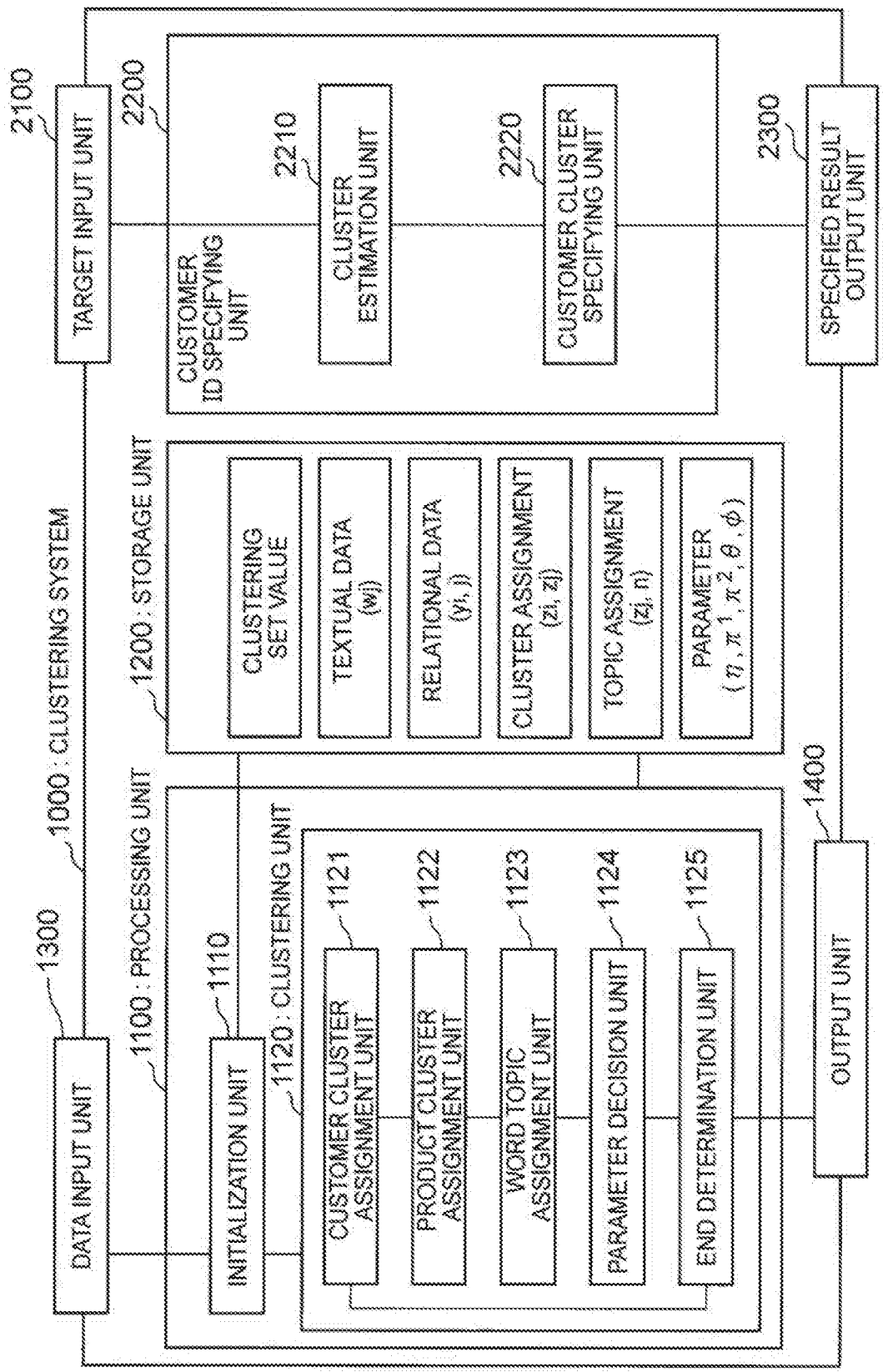
FIG. 9 It depicts a functional block diagram illustrating an example of a clustering system of a second exemplary embodiment of the present invention.

FIG. 9 is a functional block diagram illustrating an example of a clustering system of a second exemplary embodiment of the present invention. Elements similar to those of the clustering system of the first exemplary embodiment are denoted by the same signs as those illustrated in FIG. 3, and a description thereof will be omitted.

In addition to the operation in the first exemplary embodiment, when a product ID associated with textual data is newly input, the clustering system 1000 illustrated in FIG. 9 performs operation of specifying a customer ID of an appropriate customer to whom a product specified by the product ID is recommended.

In addition to the data input unit 1300, the processing unit 1100, the storage unit 1200, and the output unit 1400, the clustering system 1000 of the second exemplary embodiment further includes a target input unit 2100, a customer ID specifying unit 2200, and a specified result output unit 2300. The customer ID specifying unit 2200 includes a cluster estimation unit 2210 and a customer cluster specifying unit 2220.

In the following description, the clustering system 1000 has already completed operations of steps S1 to S8 described in the first exemplary embodiment. That is, the cluster assignment to each customer ID, cluster assignment to each product ID, topics assigned to each word of each product ID, topic assignment frequency information for each word, and various parameters obtained immediately before the end condition is satisfied, are stored in the storage unit 1200. However, in the second exemplary embodiment, it is not necessary to execute step S8, and it is sufficient that the processing of steps S3 to S7 is repeatedly executed until an end determination is satisfied.

As described above, after completion of the operation described in the first exemplary embodiment, the target input unit 2100 acquires a new product ID and textual data associated with the product ID. Specifically, the target input unit 2100 acquires a product ID of a product for which a customer suitable for recommendation is to be specified, and textual data associated with the product ID. The target input unit 2100 may be an input interface through which the new product ID associated with the textual data is input.

Here, a case will be described where the target input unit 2100 acquires the product ID of the new product, as an example. Then, the new product has not yet been released and has not been purchased by any customer, so that purchase history data indicating a relationship that any customer has purchased the new product has not yet existed. Note that, even for new products, it is common that textual data exists indicating an explanation and raw materials, for example. Therefore, such textual data is associated with the product ID.

The target input unit 2100 may acquire a plurality of new product IDs associated with textual data; however, here, to simplify the description, a case will be described where the target input unit 2100 acquires one new product ID associated with textual data, as an example. In a case where the target input unit 2100 acquires the plurality of new product IDs, the customer ID specifying unit 2200 and the specified result output unit 2300 only needs to perform similar processing for each product ID.

In a case where the new product ID associated with the textual data is given, the customer ID specifying unit 2200 specifies a customer ID of an appropriate customer to whom a product indicated by the new product ID is recommended, on the basis of the textual data, a topic distribution for each product ID cluster, and a cluster relationship.

In a case where the textual data associated with the new product ID is not in the Bag of words format, the cluster estimation unit 2210 converts the textual data into the Bag of words format.

In addition, the cluster estimation unit 2210 assigns topics to each word included in the textual data associated with the product ID. On the basis of the topics assigned to each word and the topics already assigned to each word by the word topic assignment unit 1123, the cluster estimation unit 2210 generates topic assignment frequency information for each word. The cluster estimation unit 2210 stores the topic assignment frequency information for each word in the storage unit 1200.

Further, the cluster estimation unit 2210 performs cluster assignment to the new product ID in accordance with the probability distribution ($\pi^2$).

The cluster estimation unit 2210, during decision of a belonging probability that the new product ID belongs to one product ID cluster, increases the belonging probability that the product ID belongs to the product ID cluster as the topic distribution of the product ID cluster and the topic distribution of the product ID are closer to each other. For example, the cluster estimation unit 2210 reads the topic assignment frequency information for each word included in the textual data associated with the product ID, and compares the information with the topic distribution of the product ID cluster of interest. Then, for example, the product cluster assignment unit 1122 determines how many words are included in the textual data, the words corresponding to the topic assignment frequency information determined to be similar to the topic distribution of the product ID cluster.

The product cluster assignment unit 1122 increases the belonging probability that the new product ID belongs to the product ID cluster as the number of the words increases.

The cluster estimation unit 2210 obtains the belonging probability of the new product ID for each product ID cluster, and estimates, for example, the product cluster ID having the highest belonging probability, as the product ID cluster to which the product ID belongs.

The customer cluster specifying unit 2220 specifies a customer ID cluster strongly related to the product ID cluster estimated by the cluster estimation unit 2210 (in other words, the product ID cluster estimated to include the new product ID). For example, the customer cluster specifying unit 2220 specifies a customer ID cluster having a cluster relationship equal to or greater than a predetermined value with the estimated product ID cluster, as the customer ID cluster strongly related to the product ID cluster.

Further, the customer cluster specifying unit 2220 specifies the customer ID belonging to the specified customer ID cluster as a customer ID of a customer suitable for recommendation of a product (new product in this example) indicated by the new product ID. At this time, for example, the customer cluster specifying unit 2220 may specify a customer ID whose belonging probability to the specified customer ID cluster is equal to or greater than a threshold value. The number of customer IDs is not always one.

Then, the customer cluster specifying unit 2220 generates information (hereinafter referred to as recommendation information) indicating that the product indicated by the new product ID is recommended to the customer indicated by the customer ID.

The specified result output unit 2300 outputs the recommendation information. The output mode of the recommendation information is not particularly limited. For example, the specified result output unit 2300 may output information to another device. In addition, for example, the specified result output unit 2300 may display the information on a display device. The specified result output unit 2300 may also output all or some of the topic assignment frequency information generated for each word by the cluster estimation unit 2210, the product ID cluster estimated by the cluster estimation unit 2210, and the customer ID cluster specified by the customer cluster specifying unit 2220, together with the recommendation information.

Similarly to the clustering unit 1120 and the like, the customer ID specifying unit 2200 including the cluster estimation unit 2210 and the customer cluster specifying unit 2220, the target input unit 2100, and the specified result output unit 2300 are realized by, for example, a CPU of a computer that operates in accordance with a program (clustering program).

Figure 10:
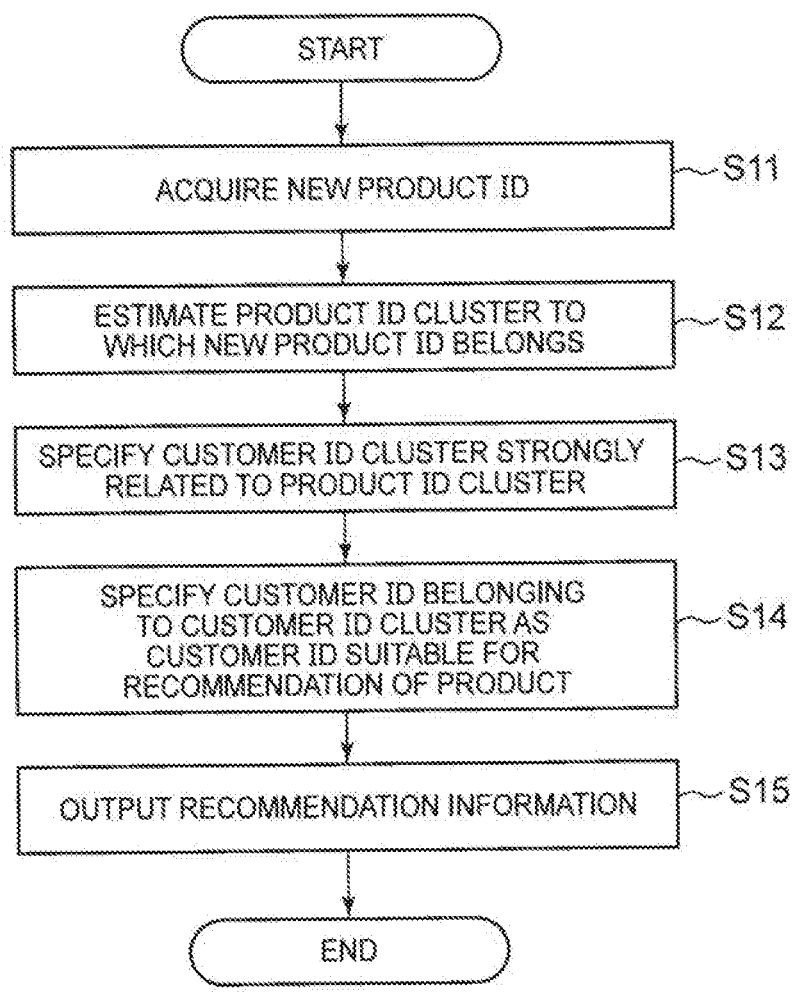
FIG. 10 It depicts a flowchart illustrating an example of processing progress of the second exemplary embodiment.

FIG. 10 is a flowchart illustrating an example of processing progress of the second exemplary embodiment. As described above, the clustering system 1000 has completed the operation described in the first exemplary embodiment. In addition, details of the operations of the target input unit 2100, the cluster estimation unit 2210, the customer cluster specifying unit 2220, and the specified result output unit 2300 have already been described, so that a detailed description thereof will be omitted below.

The target input unit 2100 acquires a new product ID associated with textual data (step S11).

The cluster estimation unit 2210 estimates a product ID cluster to which the new product ID belongs on the basis of the textual data and a topic distribution for each product ID cluster (step S12).

Next, the customer cluster specifying unit 2220 specifies a customer ID cluster strongly related to the product ID cluster estimated in step S12 on the basis of a cluster relationship (step S13).

The customer cluster specifying unit 2220 specifies a customer ID belonging to the customer ID class as a customer ID of a customer suitable for recommendation of the product indicated by the new product ID (step S14). In addition, in step S14, the customer cluster specifying unit 2220 generates recommendation information (information indicating that the product indicated by the new product ID is recommended to the customer indicated by the customer ID).

The specified result output unit 2300 outputs the recommendation information (step S15). As already described, the specified result output unit 2300 may output other information together with the recommendation information.

According to the present exemplary embodiment, the cluster estimation unit 2210 estimates the product ID cluster to which the new product ID belongs on the basis of the textual data associated with the new product ID and the topic distribution for each product ID cluster. Further, the customer cluster specifying unit 2220 specifies the customer ID cluster strongly related to the product ID cluster on the basis of the cluster relationship. The customer cluster specifying unit 2220 specifies the customer ID belonging to the customer ID class as the customer ID of the customer suitable for recommendation of the product indicated by the new product ID. Therefore, even if there is no purchase history data indicating the relationship that any customer has purchased the product specified by the new product ID, it is possible to specify the appropriate customer as the customer to whom the product is recommended.

The clustering system 1000 in the second exemplary embodiment can be referred to as a recommendation system. In addition, the clustering program in the second exemplary embodiment can be referred to as a recommendation program.

Next, a modification of the second exemplary embodiment will be described.

In the second exemplary embodiment described above, the description has been made assuming that there is no purchase history data indicating the relationship that any customer has purchased the product indicated by the new product ID; however, such purchase history data may exist. In this case, the target input unit 2100 may acquire the new product ID associated with the textual data and its purchase history data. Further, in addition to the operations described in the second exemplary embodiment, the cluster estimation unit 2210 may perform determination of the belonging probability based on the purchase history data. That is, the cluster estimation unit 2210, during decision of the belonging probability that the new product ID belongs to one product ID cluster, may set the belonging probability to a higher probability as the product ID has more relationships with customer IDs belonging to a customer ID cluster strongly related to the one product ID cluster. This operation is similar to the operation in which the product cluster assignment unit 1122 adjusts the belonging probability on the basis of the purchase history data. The other points are similar to those of the second exemplary embodiment described above. According to this modification (referred to as a first modification), even in a case where the purchase history data exists indicating the relationship that one customer has purchased the product indicated by the new product ID, it is possible to specify the appropriate customer as the customer to whom the product is recommended.

In addition, a case is acceptable where the purchase history data as described above exists and the textual data associated with the new product ID does not exist. In this case, the target input unit 2100 acquires a product ID not associated with textual data and its purchase history data. In addition, the cluster estimation unit 2210 does not perform adjustment of the belonging probability based on textual data. Then, the cluster estimation unit 2210, during decision of the belonging probability that the new product ID belongs to one product ID cluster, sets the belonging probability to a higher probability as the product ID has more relationships with customer IDs belonging to a customer ID cluster strongly related to the one product ID cluster. This operation is similar to the operation described in the first modification. In addition, the other points are similar to those of the second exemplary embodiment described above. According to this modification (referred to as a second modification), even if the purchase history data as described above exists and the textual data associated with the new product ID does not exist, it is possible to specify the appropriate customer as the customer to whom the product indicated by the product ID is recommended.

In addition, similar to the second modification, it is assumed that the purchase history data as described above exists and textual data associated with the new product ID does not exist. Then, the target input unit 2100 acquires the product ID not associated with textual data and its purchase history data. In this case, the cluster estimation unit 2210 may derive textual data corresponding to the product ID, and the specified result output unit 2300 may output the textual data. For example, similarly to the second modification, the cluster estimation unit 2210 sets the belonging probability that the new product ID belongs to each product ID cluster and estimates the product ID cluster to which the new product ID belongs. Then, the cluster estimation unit 2210 refers to the topic distribution corresponding to the product ID cluster, and specifies a topic with a high possibility of corresponding to the topic of the product ID cluster. Further, the cluster estimation unit 2210 refers to the word distribution (word distribution illustrated in FIG. 5) of the topic, and specifies one or more words having a high appearance frequency. The specified result output unit 2300 outputs the word as textual data corresponding to the new product ID. According to this modification (referred to as a third modification), it is possible to give textual data to a product ID for which corresponding textual data has not existed. In other words, it is possible to give textual data to a product for which corresponding textual data has not existed. A user of the clustering system 1000 may use the given textual data when creating a direct mail of the product, for example.

In the third modification described above, the cluster estimation unit 2210 may specify new textual data for an existing product ID associated with textual data, by operation similar to the operation as described above.

Next, various probabilities in a case where Gibbs sampling is applied to the exemplary embodiments described above are represented by mathematical expressions. Cluster assignment is performed for each customer and each product. In addition, purchase history data indicating a relationship between the customers and the products is given.

The probability that the topic of the word of the product is k is expressed by the following expression (1).

[Mathematical Expression 1]

$$p(z_{j,n}^2 = k \mid w_{j,n}^2 = v, z_{-j,n}^2, w_{-j,n}^2, \phi, \theta, \gamma, \kappa) \propto \frac{\prod_{g_2'=1}^{G_2} \theta_{g_2',k\phi k,v}}{\sum_{k'=1}^{K} \prod_{g_2'=1}^{G_2} \theta_{g_2',k'\phi k',v}} \quad (1)$$

The probability that the cluster to which the customer belongs is g1 is expressed by the following expression (2).

[Mathematical Expression 2]

$$p(z_i^1 = g_1 \mid y, \eta, \pi_1) \propto \pi_{g_1}^1 \prod_{j \in N_+^2} \eta_{z_i^1, z_j^2} \prod_{j \in N_-^2} (1 - \eta_{z_i^1, z_j^2}) \quad (2)$$

The probability that the cluster to which the product belongs is g2 is expressed by the following expression (3).

[Mathematical Expression 3]

$$p(z_j^2 = g_2 \mid \theta, y, \eta, \pi_2) \propto \pi_{g_2}^2 \prod_{k'=1}^{K} \theta_{g_2,k'} \prod_{i \in N_+^1} \eta_{z_i^1, z_j^2} \prod_{i \in N_-^1} (1 - \eta_{z_i^1, z_j^2}) \quad (3)$$

Note that, the meanings of the symbols in the expressions (1) to (3) are shown in Table 1 below.

TABLE 1

| | |
|---|---|
| $z_{j,n}^2$ | TOPIC OF n-TH WORD OF EXPLANATION OF PRODUCT j |
| $z_i^1$ | CLUSTER OF CUSTOMER i |
| $z_j^2$ | CLUSTER OF PRODUCT j |
| $w_{j,n}^1$ | n-TH WORD OF EXPLANATION OF PRODUCT j |
| $\theta_{g2}$ | TOPIC DISTRIBUTION OF PRODUCT CLUSTER g2 |
| $\phi_k$ | WORD DISTRIBUTION OF TOPIC k |
| K | MAXIMUM NUMBER OF TOPICS |
| $\pi^1$ | GROUP DISTRIBUTION OF CUSTOMER |
| $\pi^2$ | GROUP DISTRIBUTION OF PRODUCT |
| $\gamma$ | PRIOR DISTRIBUTION PARAMETER OF $\Theta$ |
| $\kappa$ | PRIOR DISTRIBUTION PARAMETER OF $\Phi$ |
| $\alpha^1$ | PRIOR DISTRIBUTION PARAMETER OF $\pi^1$ |
| $\alpha^2$ | PRIOR DISTRIBUTION PARAMETER OF $\pi^2$ |
| $\eta$ | BERNOULLI PARAMETER |
| $\beta$ | PRIOR DISTRIBUTION PARAMETER OF $\eta$ |
| Dir (•) | DIRICHLET DISTRIBUTION |
| $N_+^{\cdot}$ | SET OF CUSTOMER/PRODUCT IN WHICH PURCHASE HISTORY IS 1 |
| $N_-^{\cdot}$ | SET OF CUSTOMER/PRODUCT IN WHICH PURCHASE HISTORY IS 0 |

By performing sampling from the probability distribution defined by these probability values, the word topic assignment unit 1123 can acquire the topic distribution for the word of each product, the customer cluster assignment unit 1121 can acquire the belonging probability of each customer to each customer cluster, and the product cluster assignment unit 1122 can acquire the belonging probability of each product to each product cluster.

In the exemplary embodiments described above, a case has been described where one of the two types of domains is the customer ID and the other is the product ID, as an example; however, the type of the domain is not limited to this example. For example, one of the two types of domains may be an employee ID within a company, and the other may be a project ID within the company. In this case, for example, textual data (for example, an explanation of the project) is associated with each project ID. Relational data representing which project each employee has participated in is used as relational data. In this case, the present invention can be used for specifying an employee to whom participation in a new project is recommended.

In addition, the number of types of domains is not limited to two, and may be three or more. In a case where the number of types of domains is three or more, the cluster relationship is represented as a tensor. Examples of the case where the number of types of domains is three include a case where the clustering system performs co-clustering of customer IDs, product IDs, and region IDs. In this case, for example, it is possible to specify a customer within Shinagawa Ward to whom a certain product should be recommended.

Figure 11:
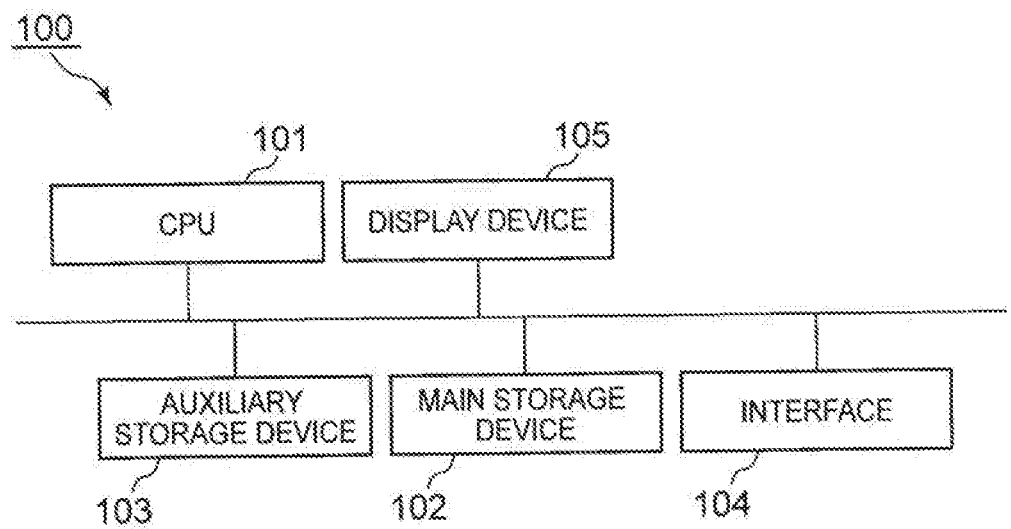
FIG. 11 It depicts a schematic block diagram illustrating a configuration example of a computer according to exemplary embodiments of the present invention.

FIG. 11 is a schematic block diagram illustrating a configuration example of the computer according to the exemplary embodiments of the present invention. A computer 100 includes, for example, a CPU 101, a main storage device 102, an auxiliary storage device 103, an interface 104, and a display device 105.

The clustering system 1000 according to the exemplary embodiments of the present invention is implemented in the computer 100. Operation of the clustering system 1000 is stored in the auxiliary storage device 103 in a format of a program (clustering program). The CPU 101 reads the program from the auxiliary storage device 103, and deploys the program on the main storage device 102, and then executes the processing described above in accordance with the program.

The auxiliary storage device 103 is an example of a non-transitory tangible medium. Other examples of the non-transitory tangible medium include a semiconductor memory, DVD-ROM, CD-ROM, a magneto-optical disk, and a magnetic disk connected via the interface 104. In addition, in a case where the program is delivered to the computer 100 via a communication line, the computer 100 to which the program is delivered may deploy the program on the main storage device 102 to execute the processing described above.

In addition, the program may be the one for partially realizing the processing described above. Further, the program may be a differential program that realizes the above-described processing in combination with another program already stored in the auxiliary storage device 103.

In addition, some or all of the constituent elements may be realized by general purpose or dedicated circuitry, a processor, or the like, or a combination thereof. These may be configured by a single chip or may be configured by a plurality of chips connected together via a bus. Some or all of the constituent elements may be realized by a combination of the program and the circuitry and the like described above.

In a case where some or all of the constituent elements are realized by a plurality of information processing devices, the circuitry, and the like, the plurality of information processing devices, the circuitry, and the like may be centrally arranged, or may be distributedly arranged. For example, the information processing device, the circuitry, and the like may be realized by being connected together via a communication network, such as a client and server system and a cloud computing system.

Figure 12:
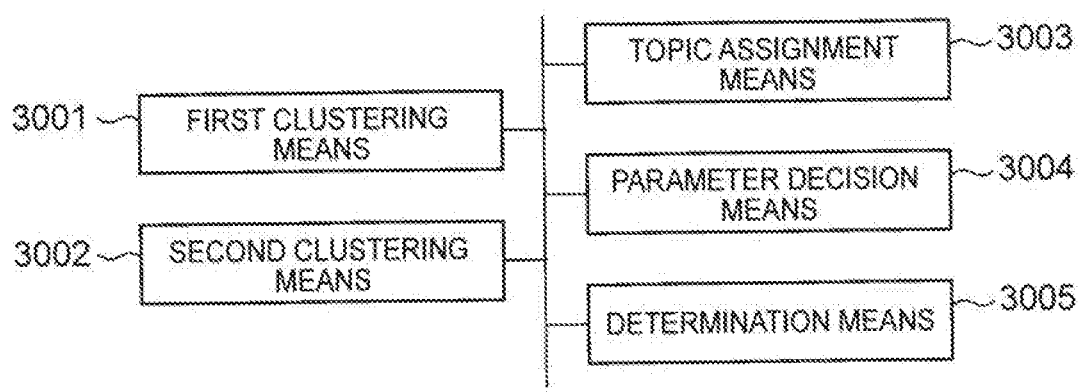
FIG. 12 It depicts a block diagram illustrating an outline of a clustering system of the present invention.

Next, an outline of the present invention will be described. FIG. 12 is a block diagram illustrating an outline of a clustering system of the present invention. The clustering system of the present invention includes a first clustering means 3001, a second clustering means 3002, a topic assignment means 3003, a parameter decision means 3004, and a determination means 3005.

The first clustering means 3001 (for example, the customer cluster assignment unit 1121) executes first clustering processing, based on relational data (for example, purchase history data) indicating a relationship between first IDs (for example, customer IDs) and second IDs (for example, product IDs), of performing clustering of the first IDs.

The second clustering means 3002 (for example, the product cluster assignment unit 1122) executes second clustering processing, based on the relational data and textual data associated with the second IDs, of performing clustering of the second IDs.

The topic assignment means 3003 (for example, the word topic assignment unit 1123) executes topic assignment processing of assigning topics for each word included in the textual data corresponding to each second ID.

The parameter decision means 3004 (for example, the parameter decision unit 1124) executes parameter decision processing of deciding a parameter used for the first clustering processing, a parameter used for the second clustering processing, and a parameter used for the topic assignment processing.

The determination means 3005 (for example, the end determination unit 1125) determines whether or not a predetermined condition is satisfied.

Then, the first clustering processing, the second clustering processing, the topic assignment processing, and the parameter decision processing are repeated until it is determined that the predetermined condition is satisfied.

With such a configuration, clustering is possible of a plurality of types of items to be able to recommend an item whose corresponding textual data exists but relational data with another type of item does not exist, to the other type of item.

In addition, it is preferable that: the parameter decision means 3004 decides a cluster relationship that is information indicating strength of a relationship between an individual cluster of the first IDs obtained as a result of the first clustering processing and an individual cluster of the second IDs obtained as a result of the second clustering processing; the first clustering means 3001, during decision of a belonging probability that one first ID belongs to one cluster, sets the belonging probability higher as the first ID has more relationships with second IDs belonging to a cluster of the second IDs strongly related to the one cluster; and the second clustering means 3002, during decision of a belonging probability that one second ID belongs to one cluster, sets the belonging probability higher as the second ID has more relationships with first IDs belonging to a cluster of the first IDs strongly related to the one cluster, and sets the belonging probability higher as a topic distribution corresponding to the one cluster and a topic distribution of the second ID are closer to each other.

In addition, the clustering system may include: a cluster estimation means (for example, the cluster estimation unit 2210) that estimates, in a case where a new second ID associated with textual data is given, a cluster to which the new second ID belongs, based on the textual data and a topic distribution for each cluster of the second IDs; and a first ID cluster specifying means (for example, the customer cluster specifying unit) that specifies a cluster of the first IDs strongly related to the estimated cluster, based on the cluster relationship.

In addition, the first ID cluster specifying means may generate information indicating that an item (for example, a product) indicated by the new second ID given is recommended for an item (a customer) indicated by a first ID belonging to the cluster of the specified first IDs.

Figure 13:
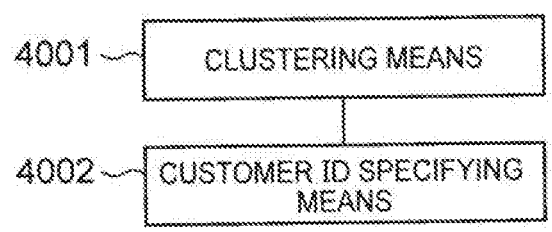
FIG. 13 It depicts a block diagram illustrating an outline of a recommendation system of the present invention.

In addition, FIG. 13 is a block diagram illustrating an outline of a recommendation system of the present invention. The recommendation system of the present invention includes a clustering means 4001 and a customer ID specifying means 4002.

The clustering means 4001 (for example, the clustering unit 1120) performs co-clustering, based on relational data (for example, purchase history data) indicating a relationship between customer IDs and product IDs and textual data associated with the product IDs, of the customer IDs and the product IDs, and decides a cluster relationship that is information indicating strength of a relationship between an individual cluster of the customer IDs and an individual cluster of the product IDs, to decide a topic distribution for each cluster of the product IDs.

The customer ID specifying means 4002 (for example, the customer ID specifying unit 2200) specifies, in a case where a new product ID associated with textual data is given, a customer ID of a customer suitable for recommendation of a product indicated by the new product ID, based on the textual data, the topic distribution for each cluster of the product IDs, and the cluster relationship.

With such a configuration, an appropriate customer can be specified as a customer to whom a product whose corresponding textual data exists but relational data with the customer does not exist is recommended.

In the above, the present invention has been described with reference to the exemplary embodiments; however, the present invention is not limited to the exemplary embodiments described above. Various modifications that can be understood by those skilled in the art within the scope of the present invention can be made to the configuration and details of the present invention.

INDUSTRIAL APPLICABILITY

The present invention is suitably applied to, for example, a clustering system used for a recommendation system.

REFERENCE SIGNS LIST

1000 Clustering system
1100 Processing unit
1110 Initialization unit
1120 Clustering unit
1121 Customer cluster assignment unit
1122 Product cluster assignment unit
1123 Word topic assignment unit
1124 Parameter decision unit
1125 End determination unit
1200 Storage unit
1300 Data input unit
1400 Output unit
2100 Target input unit
2200 Customer ID specifying unit
2210 Cluster estimation unit
2220 Customer cluster specifying unit
2300 Specified result output unit

The invention claimed is:

1. A clustering system comprising:

a first clustering unit, implemented by a processor, that executes first clustering processing, based on relational data indicating a relationship between first IDs and second IDs, of performing clustering of the first IDs;

a second clustering unit, implemented by the processor, that executes second clustering processing, based on the relational data and textual data associated with the second IDs, of performing clustering of the second IDs;

a topic assignment unit, implemented by the processor, that executes topic assignment processing of assigning a topic for each word included in textual data corresponding to each second ID;

a parameter decision unit, implemented by the processor, that executes parameter decision processing of deciding a parameter used for the first clustering processing, a parameter used for the second clustering processing, and a parameter used for the topic assignment processing; and a determination unit, implemented by the processor, that determines whether or not a predetermined condition is satisfied, wherein the first clustering processing, the second clustering processing, the topic assignment processing, and the parameter decision processing are repeated until it is determined that the predetermined condition is satisfied.

2. The clustering system according to claim 1, wherein the parameter decision unit decides a cluster relationship that is information indicating strength of a relationship between an individual cluster of the first IDs obtained as a result of the first clustering processing and an individual cluster of the second IDs obtained as a result of the second clustering processing, the first clustering unit, during decision of a belonging probability that one first ID belongs to one cluster, sets the belonging probability higher as the first ID has more relationships with second IDs belonging to a cluster of the second IDs strongly related to the one cluster, the second clustering unit, during decision of a belonging probability that second ID belongs to one cluster, sets the belonging probability higher as the one second ID has more relationships with first IDs belonging to a cluster of the first IDs strongly related to the one cluster, and sets the belonging probability higher as a topic distribution corresponding to the one cluster and a topic distribution of the second ID are closer to each other.

3. The clustering system according to claim 2, further comprising:

a cluster estimation unit, implemented by the processor, that estimates, in a case where a new second ID associated with textual data is given, a cluster to which the new second ID belongs, based on the textual data and a topic distribution for each cluster of the second IDs; and a first ID cluster specifying unit, implemented by the processor, that specifies a cluster of the first IDs strongly related to the estimated cluster, based on the cluster relationship.

4. The clustering system according to claim 3, wherein the first ID cluster specifying unit generates information indicating that an item indicated by the new second ID given is recommended for an item indicated by a first ID belonging to the cluster of the specified first IDs.

5. A clustering method comprising:

executing first clustering processing, based on relational data indicating a relationship between first IDs and second IDs, of performing clustering of the first IDs;

executing second clustering processing, based on the relational data and textual data associated with the second IDs, of performing clustering of the second IDs;

executing topic assignment processing of assigning a topic for each word included in textual data corresponding to each second ID;

executing parameter decision processing of deciding a parameter used for the first clustering processing, a parameter used for the second clustering processing, and a parameter used for the topic assignment processing; and determining whether or not a predetermined condition is satisfied, wherein the first clustering processing, the second clustering processing, the topic assignment processing, and the parameter decision processing are repeated until it is determined that the predetermined condition is satisfied.

6. A non-transitory computer-readable recording medium in which a clustering program is recorded, the clustering program causing a computer to execute:

first clustering processing, based on relational data indicating a relationship between first IDs and second IDs, of performing clustering of the first IDs;

second clustering processing, based on the relational data and textual data associated with the second IDs, of performing clustering of the second IDs;

topic assignment processing of assigning a topic for each word included in textual data corresponding to each second ID;

parameter decision processing of deciding a parameter used for the first clustering processing, a parameter used for the second clustering processing, and a parameter used for the topic assignment processing; and determination processing of determining whether or not a predetermined condition is satisfied, wherein the first clustering processing, the second clustering processing, the topic assignment processing, and the parameter decision processing are repeated until it is determined that the predetermined condition is satisfied.

* * * * *